(12) United States Patent
Demissie et al.

(10) Patent No.: US 10,047,571 B2
(45) Date of Patent: Aug. 14, 2018

(54) LOCKING NUT WITH A DIRECTIONAL COUPLING MECHANISM (71) Applicant: Halliburton Energy Services, Inc., Houston, TX (US)

(72) Inventors: Mesfin Ayele Demissie, Edmonton (CA); Alben D'Silva, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 146 days.

(21) Appl. No.: 15/106,114

(22) PCT Filed: Jan. 21, 2014

(86) PCT No.: PCT/CA2014/000042
§ 371 (c)(1),
(2) Date: Jun. 17, 2016

(87) PCT Pub. No.: WO2015/109382
PCT Pub. Date: Jul. 30, 2015

(65) Prior Publication Data
US 2017/0030148 A1 Feb. 2, 2017

(51) Int. Cl.
*F16B 39/22* (2006.01)
*E21B 17/043* (2006.01)
(Continued)

(52) U.S. Cl.
CPC ............ *E21B 17/043* (2013.01); *E21B 7/062* (2013.01); *F16B 37/145* (2013.01); *F16B 39/22* (2013.01);
(Continued)

(58) Field of Classification Search
CPC ........ F16B 2/005; F16B 37/12; F16B 37/145; F16B 39/22; F16B 39/28; F16B 39/32; F16B 39/34
(Continued)

(56) References Cited

U.S. PATENT DOCUMENTS 634,776 A * 10/1899 Thompson .............. F16B 39/32
411/297
753,421 A 3/1904 Mowry
(Continued)

FOREIGN PATENT DOCUMENTS

CA 2054076 A1 4/1992
CA 2103183 A1 5/1994
(Continued)

*Primary Examiner* — Roberta S Delisle
(74) *Attorney, Agent, or Firm* — Terrence N. Kuharchuk; Parlee McLaws LLP; Clive D. Menezes (57) ABSTRACT

A locking nut for installation on a cylinder, including a nut body defining a nut engagement surface and a directional coupling mechanism associated with the nut body, for locking the nut body with the cylinder in response to relative rotation between the nut body and the cylinder in a locking direction. The directional coupling mechanism may include a plurality of recesses, a plurality of rolling members contained within the recesses, and a retaining device for retaining the rolling members in the recesses. A method of installing the locking nut on the cylinder, including engaging the nut engagement surface with a cylinder engagement surface, inserting the rolling members in the recesses, threadably connecting the nut body with the cylinder in order to install the locking nut on the cylinder, and connecting the retaining device with the nut body in order to retain the rolling members within the recesses.

26 Claims, 5 Drawing Sheets

(51) Int. Cl.
*F16B 39/28* (2006.01)
*F16B 39/32* (2006.01)
*F16L 15/08* (2006.01)
*E21B 7/06* (2006.01)
*F16B 37/14* (2006.01)
*F16B 2/00* (2006.01)

(52) U.S. Cl.
CPC .............. *F16B 39/28* (2013.01); *F16B 39/32* (2013.01); *F16L 15/08* (2013.01); *F16B 2/005* (2013.01)

(58) Field of Classification Search
USPC .......................................... 411/259, 297, 302
See application file for complete search history.

(56) References Cited

U.S. PATENT DOCUMENTS

| | | | |
|---|---|---|---|
| 922,482 A * | 5/1909 | Jacobs | F16B 39/32 411/297 |
| 959,222 A * | 5/1910 | Jacobs | F16B 39/32 12/29 |
| 986,492 A | 3/1911 | Murdock | |
| 1,309,817 A | 7/1919 | Semple | |
| 1,792,381 A * | 2/1931 | Lescadieu | F16B 39/32 411/298 |
| 2,660,212 A | 11/1953 | Allen | |
| 3,308,682 A * | 3/1967 | Puidokas | F16H 48/08 411/335 |
| 5,004,389 A | 4/1991 | Spinger et al. | |
| 5,016,920 A | 5/1991 | Anderson | |
| 6,050,609 A | 4/2000 | Boscaljon et al. | |
| 6,244,361 B1 | 6/2001 | Comeau et al. | |
| 6,769,499 B2 | 8/2004 | Cargill et al. | |
| 7,445,413 B2 | 11/2008 | Niederhageboeck | |
| 7,896,595 B2 | 3/2011 | Case | |
| 8,403,611 B2 * | 3/2013 | Friesen | F16B 39/32 411/191 |
| 9,217,461 B2 * | 12/2015 | Rode | B23P 15/003 |
| 9,587,667 B2 * | 3/2017 | Rode | B23P 15/003 |
| 2011/0194911 A1 * | 8/2011 | Leroyer | H01R 13/623 411/190 |

FOREIGN PATENT DOCUMENTS

| | | | |
|---|---|---|---|
| CA | 2779014 A1 | 5/2011 | |
| CN | 201031850 | 3/2008 | |
| CN | 201041185 | 3/2008 | |
| CN | 201335081 | 10/2009 | |
| CN | 201535307 | 7/2010 | |
| GB | 2272951 A * | 6/1994 | ............. F16B 39/32 |

* cited by examiner

LOCKING NUT WITH A DIRECTIONAL COUPLING MECHANISM

TECHNICAL FIELD

The present disclosure relates to threaded connections, and more particularly, to a component of a threaded connection with a directional coupling mechanism.

BACKGROUND OF THE INVENTION

A threaded connection between two components may be provided by complementary threaded surfaces on the two components. In many threaded connections, an external thread on one of the two components is configured to engage with an internal thread on the other of the two components to releasably connect the two components. Such threaded connections may be referred to generally as male/female threaded connections, wherein the component with the external thread may be referred to as the male component and the part with the internal thread may be referred to as the female component. Threaded connections, including male/female threaded connections, are vulnerable to loosening due to various causes, including vibration and human error (in which a threaded connection is mistakenly loosened).

BRIEF DESCRIPTION OF DRAWINGS

Embodiments of the invention will now be described with reference to the accompanying drawings, in which.

DETAILED DESCRIPTION

References in this document to orientations, to operating parameters, to ranges, to lower limits of ranges, and to upper limits of ranges are not intended to provide strict boundaries for the scope of the invention, but should be construed to mean "approximately" or "about" or "substantially", within the scope of the teachings of this document, unless expressly stated otherwise.

The present disclosure is directed at a component of a threaded connection. More particularly, the present disclosure is directed at a locking nut for installation on a cylinder to provide a threaded connection between the locking nut and the cylinder.

The cylinder may be comprised of any cylindrical part including, as non-limiting examples, a shaft, a mandrel, a bolt, a stud, a rod, a screw, or any other cylindrical object. The cylinder may be solid or may define a cylinder bore extending fully or partially through the cylinder.

In some particular embodiments, the cylinder may be comprised of a shaft which defines a shaft bore extending through the shaft.

The cylinder is comprised of a cylinder engagement surface for engaging with the locking nut. The cylinder engagement surface may be an exterior surface of the cylinder or an interior surface of the cylinder. The cylinder engagement surface comprises a threaded cylinder section which provides a cylinder thread. The cylinder thread may be an external thread or an internal thread.

The cylinder thread may be provided in the threaded cylinder section in any suitable manner. As a non-limiting example, the cylinder thread may be defined in the cylinder engagement surface.

In some embodiments, the threaded cylinder section may be comprised of the entirety or substantially the entirety of the cylinder engagement surface. In some embodiments, the threaded cylinder section may be comprised of a portion of the cylinder engagement surface so that the cylinder engagement surface is comprised of both a threaded cylinder section and an unthreaded cylinder section.

The threaded connection between the locking nut and the cylinder may be used on its own, or may be used in any suitable apparatus.

In some embodiments, the apparatus in which the threaded connection is used may be configured to be inserted within a borehole. In some embodiments, the apparatus in which the threaded connection is used may be an apparatus for use in drilling a borehole. In some embodiments, the apparatus in which the threaded connection is used may be a drilling motor. In some embodiments, the apparatus in which the threaded connection is used may be a rotary steerable drilling apparatus.

The locking nut is comprised of a nut engagement surface for engaging with the cylinder engagement surface. The nut engagement surface may be an exterior surface of the locking nut or may be an interior surface of the locking nut. The locking nut is configured so that the nut engagement surface is engageable with the cylinder engagement surface. The nut engagement surface comprises a threaded nut section which provides a nut thread. The nut thread may be an external thread or an internal thread. The locking nut is configured so that the threaded nut section is threadably connectable with the threaded cylinder section.

The nut thread may be provided in the threaded nut section in any suitable manner. As a non-limiting example, the nut thread may be defined in the nut engagement surface.

In some embodiments, the locking nut may be comprised of a nut body.

In some embodiments, the nut body may have a first nut end and a second nut end. In some embodiments, the nut engagement surface may extend the full distance between the first nut end and the second nut end of the nut body. In some embodiments, the nut engagement surface may extend part of the distance between the first nut end and the second nut end of the nut body.

In some embodiments, the nut body may have a nut torquing surface for engaging with a suitable tool for use in rotating the nut body relative to the cylinder. The nut torquing surface may be an exterior nut surface or an interior nut surface, depending upon the configuration of the nut body.

The nut torquing surface may be comprised of any suitably shaped surface. In some embodiments, the nut torquing surface may be polygonal, such as a pentagonal or a hexagonal surface. In some embodiments, the nut torquing surface may be a round surface which may be engaged with a pipe wrench or other suitable tool.

In some embodiments, the nut body may be solid. In some such embodiments, the nut engagement surface may be comprised of an exterior nut surface so that the threaded nut section may be comprised of an external nut thread.

In some embodiments, the nut body may define a nut bore so that the nut body has an interior nut surface which surrounds the nut bore. In some such embodiments, the nut engagement surface may be comprised of the interior nut surface so that the threaded nut section may be comprised of an internal nut thread. In some such embodiments, the nut engagement surface may be comprised of an exterior nut surface so that the threaded nut section may be comprised of an external nut thread.

In some embodiments, the threaded nut section may be comprised of the entirety or substantially the entirety of the nut engagement surface. In some embodiments, the threaded nut section may be comprised of a portion of the nut engagement surface so that the nut engagement surface is comprised of both a threaded nut section and an unthreaded nut section.

The threaded nut section of the locking nut threadably connects with the threaded cylinder section of the cylinder in order to provide a threaded connection between the cylinder and the locking nut, thereby installing the locking nut on the cylinder.

The locking nut is comprised of a locking mechanism for preventing or reducing the loosening of the threaded connection between the threaded cylinder section and the threaded nut section.

In some embodiments, the locking mechanism may be comprised of a directional coupling mechanism, wherein the directional coupling mechanism is a device which is capable of locking the nut body with the cylinder in response to relative rotation between the nut body and the cylinder in a locking direction when the locking nut is installed on the cylinder, and which accommodates relative rotation between the nut body and the cylinder in a rotating direction which is opposite to the locking direction when the locking nut is installed on the cylinder.

The directional coupling mechanism may be comprised of any suitable device which is capable of providing a locking direction of relative rotation and a rotating direction of relative rotation. In some embodiments, the directional coupling mechanism may be comprised of a one-way bearing, a sprag clutch, a freewheel mechanism, or a similar device.

In some embodiments, the directional coupling mechanism may be connected with, integral with, or otherwise associated with the nut body. In such embodiments, the directional coupling mechanism may be connected with, integral with, or otherwise associated with the nut body in any suitable manner. In some particular embodiments, the directional coupling mechanism may be connected with the nut body. In some particular embodiments, some or all of the components of the directional coupling mechanism may be integral with the nut body.

In some embodiments, the directional coupling mechanism may be comprised of a plurality of rolling members spaced around a circumference of the nut engagement surface, wherein the rolling members lock the nut body with the cylinder in response to relative rotation between the nut body and the cylinder in the locking direction when the locking nut is installed on the cylinder, and accommodate relative rotation between the nut body and the cylinder in the rotating direction when the locking nut is installed on the cylinder.

A rolling member may be comprised of any suitable structure which has a rolling surface which permits the rolling member to roll or rotate about an axis which is substantially perpendicular to the plane of relative rotation between the nut body and the cylinder.

The rolling surface of a rolling member may be comprised of any suitable shape. In some embodiments, the rolling surface of a rolling member may be a round rolling surface so that the rolling surface has a constant radius relative to its center of rotation. In such embodiments, the rolling member may be comprised of a spherical roller, a cylindrical roller, a tapered roller, a pin roller, a needle roller or some other suitable rolling element.

In some embodiments, the rolling surface of a rolling member may be a shaped rolling surface so that the rolling surface has a variable radius relative to its center of rotation. In such embodiments, the rolling member may be or may function as a cam, a sprag, a pawl or similar structure in order to provide the locking function.

A rolling member may be comprised of any suitable shape. In some embodiments, a rolling member may be comprised of a spherical roller having a round rolling surface. In some embodiments, a rolling member may be comprised of a cylindrical roller having a round rolling surface. In some embodiments, a rolling member may be a generally spherical roller having a shaped rolling surface. In some embodiments, a rolling member may be a generally cylindrical roller having a shaped rolling surface.

The plurality of rolling members may be comprised of any number of rolling members. The rolling members may be arranged around the circumference of the nut engagement surface in any suitable configuration. In some embodiments, the plurality of rolling members may be spaced substantially evenly around the circumference of the nut engagement surface.

In some embodiments, the directional coupling mechanism may be further comprised of one or more recesses for containing the plurality of rolling members. In such embodiments, the one or more recesses may be associated with either the locking nut or the cylinder. In some such embodiments, the one or more recesses may be defined in the cylinder engagement surface. In some such embodiments, the one or more recesses may be defined in the nut engagement surface.

In some embodiments, the rolling members may be interposed between the nut engagement surface and the cylinder engagement surface when the locking nut is installed on the cylinder, so that the rolling members interact with the nut engagement surface and/or the cylinder engagement surface in order to lock the nut body with the cylinder. In some such embodiments, the rolling members may be contained in the one or more recesses.

In some embodiments, rolling members having shaped rolling surfaces may interact with the nut engagement surface and/or the cylinder engagement surface in order to lock the nut body with the cylinder.

In some embodiments in which the directional coupling mechanism is comprised of one or more recesses, the one or more recesses may be comprised of a plurality of shaped recesses and the rolling members may interact with the shaped recesses in order to lock the nut body with the cylinder. In some such embodiments, the rolling members may be comprised of round rolling surfaces.

In some such embodiments, the shaped recesses may be comprised of wedge-shaped recesses defined in the nut engagement surface. A wedge-shaped recess may be configured in any suitable manner.

In some embodiments, a wedge-shaped recess may have a deep recess depth within the nut engagement surface at a deep recess end of the recess. In some embodiments, a wedge-shaped recess may have a shallow recess depth within the nut engagement surface at a shallow recess end of the recess. The ends of a wedge-shaped recess are separated circumferentially about the circumference of the nut engagement surface.

A wedge-shaped recess may have a recess surface between the deep recess end and the shallow recess end so that the recess depth varies between the deep recess depth at the deep recess end and the shallow recess depth at the shallow recess end. In some embodiments, the recess surface may be defined in the nut engagement surface. In some embodiments, the recess surface may be a sloped recess surface so that a gradual transition in the recess depth is provided along a recess length which extends between the deep recess end and the shallow recess end.

In some particular embodiments, the directional coupling mechanism may be comprised of a plurality of rolling members and a plurality of wedge-shaped recesses arranged around the circumference of the nut engagement surface, wherein the plurality of rolling members is contained within the plurality of recesses so that the rolling members are spaced around the circumference of the nut engagement surface. Some or all of a plurality of rolling members and a plurality of recesses may be configured the same, or a plurality of rolling members and a plurality of recesses may have a plurality of configurations.

A plurality of wedge-shaped recesses may be comprised of any number of recesses. The recesses may be arranged around the circumference of the nut engagement surface in any suitable configuration. In some embodiments, a plurality of recesses may be spaced substantially evenly around the circumference of the nut engagement surface.

A rolling member may be arranged in its corresponding recess so that it is capable of rolling a limited distance within the recess along the recess length, between the deep recess end and a position toward the shallow recess end.

In some embodiments in which the directional coupling mechanism is comprised of a plurality of rolling members and a plurality of recesses, a rolling member may be contained within each recess. In some embodiments, only some recesses may contain a rolling member.

A rolling member having a round rolling surface has a rolling diameter, which is defined by the rolling surface of the rolling member. The deep recess depth and the shallow recess depth of a wedge-shaped recess and the rolling diameter of its corresponding rolling member are selected so that the rolling member can fit within the wedge-shaped recess at the deep recess end and can roll a portion of the distance toward the shallow recess end before the recess becomes too shallow for the rolling member to continue rolling toward the shallow recess end, thereby causing the rolling member to bind within the wedge-shaped recess, to resist further rolling toward the shallow recess end, and to provide a locking function. Consequently, the rolling diameter of a rolling member is larger than the shallow recess depth of its corresponding recess.

A rolling member having a shaped rolling surface has a minimum rolling diameter and a maximum rolling diameter, which are defined by the rolling surface of the rolling member. The depth of a recess and the rolling diameters of a corresponding rolling member having a shaped rolling surface are selected so that the minimum rolling diameter of the rolling member can fit within the recess and the maximum rolling diameter of the rolling member cannot fit within the recess. Consequently, the maximum rolling diameter of a rolling member having a shaped rolling surface is greater than the depth of its corresponding recess.

The rolling members may be constructed of any material or combination of materials which is capable of interacting with the nut engagement surface and/or the cylinder engagement surface in order to lock the nut body with the cylinder.

In some embodiments, the threaded nut section may extend along the nut engagement surface from the first nut end of the nut body toward the second nut end. In some embodiments, the threaded nut section may extend within the nut bore to the second nut end. In some embodiments, the threaded nut section may terminate along the nut engagement surface between the first nut end and the second nut end so that the nut engagement surface is comprised of the threaded nut section and an unthreaded nut section. In some embodiments, the unthreaded nut section may extend along the nut engagement surface from the second nut end of the nut body toward the first nut end and may terminate along the nut engagement surface where the unthreaded nut section meets the threaded nut section.

In some embodiments, the locking mechanism may be located within or otherwise associated with the threaded nut section. In some embodiments, the locking mechanism may be located within or otherwise associated with the unthreaded nut section.

In some embodiments in which the locking mechanism is comprised of a directional coupling mechanism comprising one or more recesses, the one or more recesses may be located within or otherwise associated with the unthreaded nut section and/or may be located at or adjacent to the second end of the nut body. In some embodiments, the one or more recesses may be accessible from the second nut end. In some embodiments, the one or more recesses may be adjacent to the second nut end. In some embodiments, the rolling members can be inserted into the recesses from the second nut end and can be removed from the recesses from the second nut end when the nut engagement surface is engaged with the cylinder engagement surface.

In some embodiments, a rolling member may be comprised of a rolling member tool surface for engagement with a tool to facilitate removal of the rolling member from the locking nut and/or from its corresponding recess. The rolling member tool surface may be comprised of any surface which is suitable for engaging with a selected tool. In some embodiments, the rolling member tool surface may be comprised of a bore defined within the rolling member which is accessible from the second nut end when the rolling member is contained within its corresponding recess. In some embodiments, the bore may be threaded to facilitate engagement of the rolling member with a threaded tool.

In some embodiments, a rolling member may be constructed of a material which is magnetic or which is attracted to a magnet, in order to facilitate removal of the rolling member from the locking nut and/or from its corresponding recess using a tool with suitable magnetic properties.

In some embodiments in which the nut engagement surface is comprised of the unthreaded nut section, the one or more recesses may be defined in the unthreaded nut section. In some such embodiments, the one or more recesses may be defined in the unthreaded nut section adjacent to the second nut end.

In some embodiments, the locking nut may be comprised of a retaining device for retaining the one or more rolling members within the locking nut and/or within one or more recesses when the cylinder is received within the nut bore. The retaining device may be comprised of any suitable structure or device. In some embodiments, the retaining device may be selectively connectable with the nut body. In some embodiments, the retaining device can be disconnected from the nut body when the nut engagement surface is engaged with the cylinder engagement surface.

In some embodiments, the retaining device may be comprised of a retaining ring. In some embodiments, the retaining ring may be configured to extend around the circumference of the nut engagement surface.

In some embodiments, the retaining ring may be associated with the second nut end of the nut body. In some embodiments, the retaining ring may be accessible from the second nut end. In some embodiments, the retaining ring may be adjacent to the second nut end.

In some embodiments, the retaining device may be further comprised of a retaining ring groove defined by the nut body, for selectively connecting the retaining ring with the nut body. In some embodiments, the retaining ring groove may be associated with the second nut end of the nut body. In some embodiments, the retaining ring groove may be adjacent to the second nut end. In some embodiments, the retaining ring groove may permit the retaining ring to be inserted within the retaining ring groove from the second nut end and may permit the retaining ring to be removed from the retaining ring groove from the second nut end when the nut engagement surface is engaged with the cylinder engagement surface.

The locking nut may be configured to resist rotation of the locking nut to the left relative to the cylinder, or the locking nut may be configured to resist rotation of the locking nut to the right relative to the cylinder, depending upon the orientation and configuration of the locking mechanism.

In some embodiments in which the locking mechanism is comprised of a directional coupling mechanism comprising a plurality of rolling members, the resistance to rotation of the locking nut relative to the cylinder may be provided by the interaction between the rolling members and the nut engagement surface and/or the cylinder engagement surface.

In some embodiments in which the locking mechanism is comprised of a directional coupling mechanism comprising a plurality of rolling members and a plurality of recesses, the resistance to rotation of the locking nut relative to the cylinder may be provided by the interaction between the rolling members and the recess surfaces of the corresponding recesses and/or the cylinder engagement surface. Relative rotation in one direction will cause a rolling member to roll along the cylinder engagement surface toward the deep recess end of its corresponding recess, while relative rotation in the opposite direction will cause the rolling member to roll along the cylinder engagement surface toward the shallow recess end of its corresponding recess.

If the recesses are oriented and configured so that the rolling members are urged toward the shallow recess end by rotation of the locking nut to the left relative to the cylinder when the locking nut is installed on the cylinder, rotation of the locking nut to the left relative to the cylinder will be resisted by the locking nut as the rolling members become wedged between the cylinder engagement surface and the recess surfaces.

If the recesses are oriented and configured so that the rolling members are urged toward the shallow recess end by rotation of the locking nut to the right relative to the cylinder when the locking nut is installed on the cylinder, rotation of the locking nut to the right relative to the cylinder will be resisted by the locking nut as the rolling members become wedged between the cylinder engagement surface and the recess surfaces.

Figure 9:
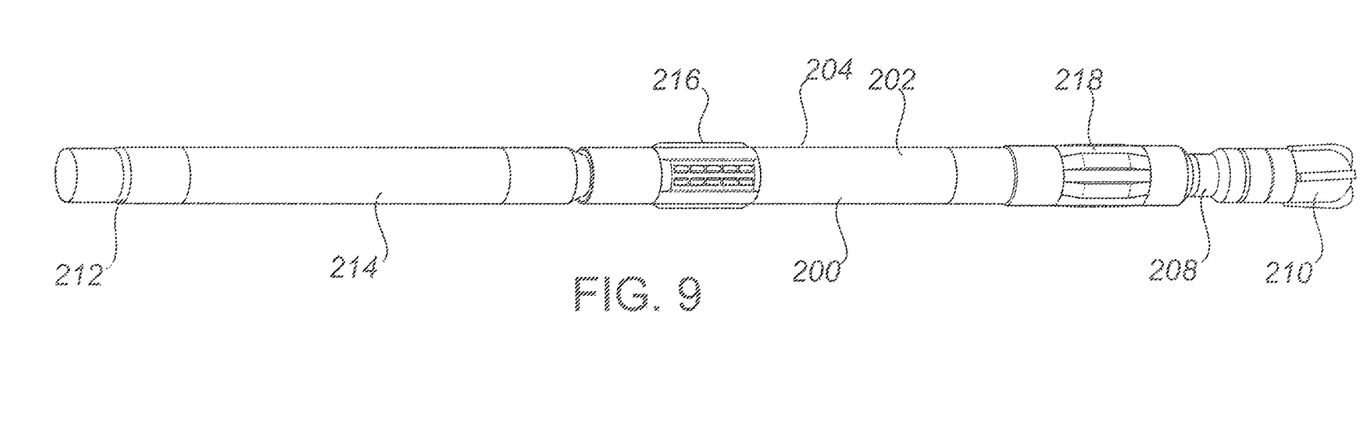
FIG. 9 is a pictorial view of an exemplary rotary steerable drilling apparatus, shown connected with a drill string.
Figure 10:
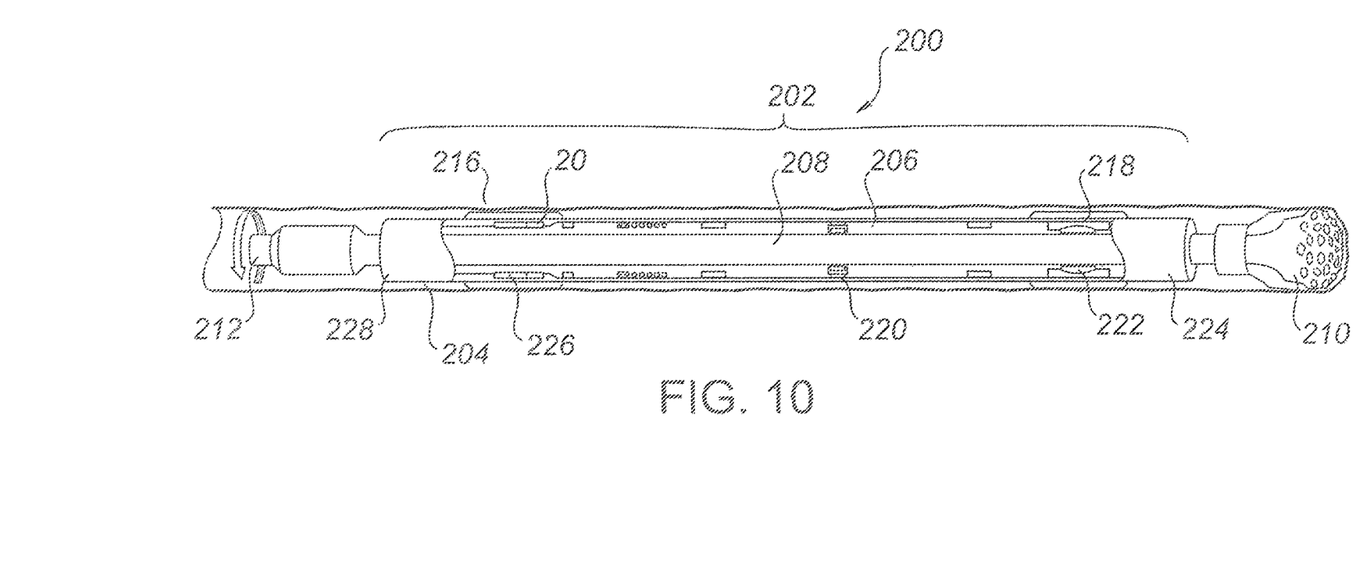
FIG. 10 is a schematic longitudinal section assembly view of the exemplary rotary steerable drilling apparatus depicted in FIG. 9, shown disconnected from the drill string.

FIGS. 1-7 depict an exemplary embodiment of a locking nut. FIG. 8 depicts the exemplary embodiment of locking nut depicted in FIGS. 1-7 installed on an embodiment of a cylinder. FIGS. 9-10 depict an exemplary rotary steerable drilling apparatus in which the locking nut may be used.

As a non-limiting example, the exemplary embodiment of the locking nut may be used in the exemplary rotary steerable drilling apparatus as a component of a preloading system for preloading the thrust bearings which are included in the exemplary rotary steerable drilling apparatus. As non-limiting examples, the locking nut may be used in such a preloading system by exerting a compressive force on the thrust bearings and/or by exerting a tensile force on the shaft.

In the exemplary embodiment depicted in FIGS. 1-8, the locking nut may form a threaded connection with the shaft of the exemplary rotary steerable drilling apparatus in order to exert a tensile force on the shaft and thereby preload the thrust bearings. In other embodiments, the locking nut may form a threaded connection with the housing of the exemplary rotary steerable drilling apparatus in order to exert a compressive force on the thrust bearings.

Other embodiments of the locking nut may be provided for installation on other embodiments of cylindrical parts and may be included in other apparatus within the scope of the present disclosure.

As non-limiting examples, the exemplary rotary steerable apparatus (200) may be a rotary steerable drilling apparatus of the type described in U.S. Pat. No. 6,244,361 (Comeau et al) and/or U.S. Pat. No. 6,769,499 (Cargill et al).

Referring first to FIGS. 9-10, the exemplary rotary steerable drilling apparatus (200) is comprised of a housing (202) having an exterior (204) and an interior housing bore (206). A shaft (208) extends through the housing bore (206). The shaft (208) is rotatable relative to the housing (202).

In the exemplary rotary steerable apparatus (200), a drill bit (210) is connected with a distal end of the shaft (208), and a drill string (212) is connected with a proximal end of the shaft (208). The drill string (212) may include a drill string communication system (214) such as a measurement-while-drilling system.

In the exemplary rotary steerable drilling apparatus (200), an anti-rotation device (216) is connected with or integrated into the housing (202) adjacent to a proximal end of the housing (202), and a near-bit stabilizer (218) is connected with or integrated into the housing (202) adjacent to a distal end of the housing (202).

In the exemplary rotary steerable drilling apparatus (200), a deflection mechanism (220) is contained within the housing (202), which may be actuated to cause radial deflection of a portion of the shaft (208) within the housing bore (206).

In the exemplary rotary steerable drilling apparatus (200), a lower focal bearing (222), a lower rotary seal assembly (224), an upper bearing (226), and an upper rotary seal assembly (228) are located within the housing bore (206) to support the shaft (208) within the housing (202) and to provide seals between the housing (202) and the shaft (208).

In the exemplary rotary steerable drilling apparatus (200), the lower focal bearing (222) is located axially between the deflection mechanism (220) and the lower rotary seal assembly (224).

The deflection mechanism (220) may be comprised of any structure, device or apparatus which is capable of causing the radial deflection of the portion of the shaft (208) within the housing bore (206). The radial deflection of the portion of the shaft (208) may result in bending of the shaft (208) within the housing bore (206). Additionally or alternatively, the radial deflection of the portion of the shaft (208) may result in articulation of the shaft (208) within the housing bore (206), if the shaft (208) is comprised of a joint (not shown) which facilitates such articulation.

In the exemplary rotary steerable drilling apparatus (200) depicted in FIGS. 9-10, the movement of the shaft (208) is accommodated by the lower focal bearing (222), which acts as a fulcrum for the shaft (208). As a result, the radial deflection of the shaft (208) by the deflection mechanism (220) causes the shaft (208) to tilt within the housing bore (206) about the lower focal bearing (222).

Referring to FIGS. 1-8, the exemplary embodiment of a locking nut (20) is depicted for use in providing a threaded connection with a cylinder. Referring to FIGS. 9-10, the cylinder depicted in FIG. 8 may be the shaft (208) in the exemplary rotary steerable drilling apparatus (200).

Referring to FIG. 8, the shaft (208) is comprised of a cylinder engagement surface (22), a threaded cylinder section (24) and an unthreaded cylinder section (26). The cylinder engagement surface (22) is an exterior surface of the shaft (208). The threaded cylinder section (14) therefore comprises an external cylinder thread (28) which is defined in the cylinder engagement surface (22) of the shaft (208). The shaft (208) also defines a shaft bore (30) extending through the shaft (208). In the shaft (208) depicted in FIG. 8, the unthreaded cylinder section (26) is relatively smooth.

The locking nut (20) is not limited for use with the shaft (208) depicted in FIG. 8, and is not limited for use with the exemplary rotary steerable drilling apparatus (200) depicted in FIGS. 9-10.

Figure 1:
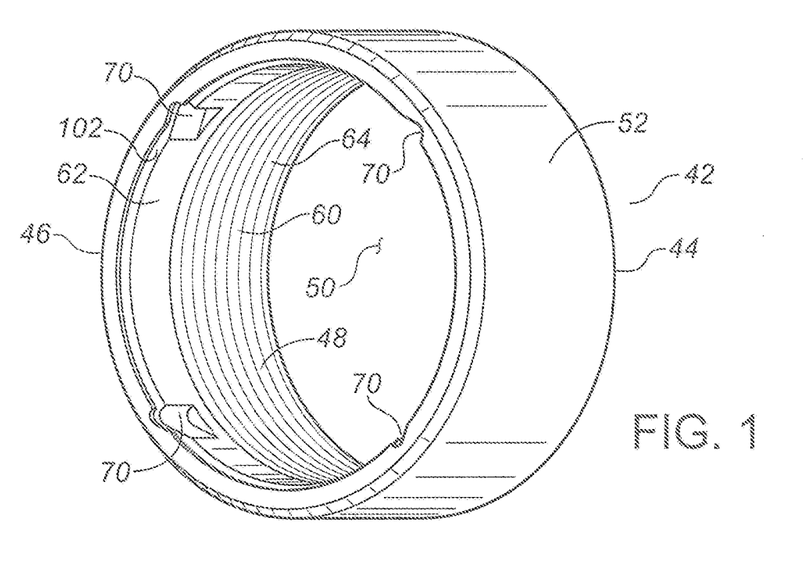
FIG. 1 is a pictorial view of an exemplary nut body in an exemplary embodiment of a locking nut.

Referring to FIG. 1, in the exemplary embodiment, the locking nut (20) is comprised of a nut body (42). The nut body (42) has a first nut end (44), a second nut end (46), and defines a nut engagement surface (48) extending the full distance between the first nut end (44) and the second nut end (46). In the exemplary embodiment, the nut engagement surface (48) is an interior surface of the nut body (42) which surrounds a nut bore (50). The nut body (42) also has an exterior nut surface (52).

In the exemplary embodiment, the exterior nut surface (52) defines a substantially round nut torquing surface, for engaging with a suitable wrench in order to rotate the nut body (42) relative to the shaft (208).

In the exemplary embodiment, the shaft (208) is receivable within the nut bore (50) in order to engage the nut engagement surface (48) with the cylinder engagement surface (22).

In the exemplary embodiment, the nut engagement surface (48) comprises a threaded nut section (60) and an unthreaded nut section (62). The threaded nut section (60) extends along the nut engagement surface (48) from the first nut end (44) toward the second nut end (46). The unthreaded nut section (62) extends along the nut engagement surface (48) from the second nut end (46) toward the first nut end (44).

The threaded nut section (60) comprises an internal nut thread (64). In the exemplary embodiment, the internal nut thread (64) is defined in the nut engagement surface (48) of the nut body (42). In the exemplary embodiment, the unthreaded nut section (62) is relatively smooth.

The threaded nut section (60) is threadably connectable with the threaded cylinder section (24).

The locking nut (20) is comprised of a locking mechanism for preventing or reducing the loosening of the threaded connection between the threaded cylinder section and the threaded nut section. In the exemplary embodiment, the locking mechanism is comprised of a directional coupling mechanism.

In the exemplary embodiment, the directional coupling mechanism is comprised of a plurality of recesses (70) spaced around a circumference of the nut engagement surface (48). In the exemplary embodiment, the recesses (70) are defined in the nut engagement surface (48), adjacent to the second nut end (46). As a result, in the exemplary embodiment, the recesses (70) are defined in the unthreaded nut section (62) of the nut engagement surface (48).

In the exemplary embodiment, the plurality of recesses (70) consists of four substantially identical recesses (70). In other embodiments, more or fewer than four recesses (70) may be provided. In other embodiments, the shape and configuration may vary amongst a plurality of recesses (70). A relatively larger number of recesses (70) may assist in increasing the overall locking force capacity of the locking mechanism, and may assist in reducing the "slip", "play" and/or "backlash" in the locking mechanism against rotation of the locking nut (20) in the locking direction. Varying the shapes and configurations of the recesses (70) may provide the locking nut (20) with a variety of locking features and/or properties.

In the exemplary embodiment, the recesses (70) are spaced substantially evenly around the circumference of the nut engagement surface (48). In other embodiments, the recesses (70) may be spaced unevenly around the circumference of the nut engagement surface (48) and/or may be spaced around only a portion of the circumference of the nut engagement surface (48).

Figure 3:
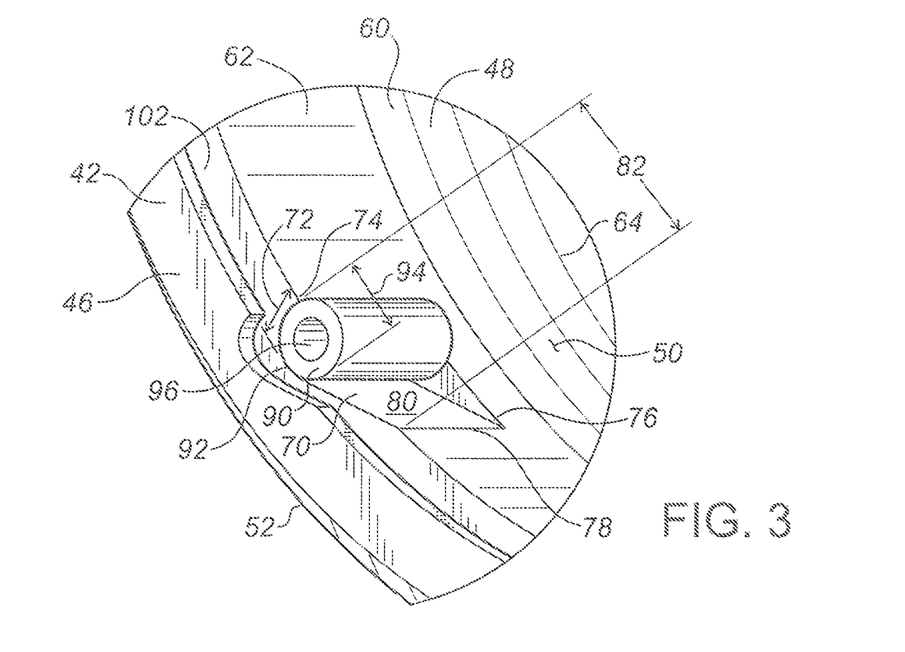
FIG. 3 is an isolated pictorial view of a recess in the exemplary nut body depicted in FIG. 1, with an exemplary rolling member inserted in the recess.

In the exemplary embodiment, the recesses (70) are wedge-shaped. Each of the recesses (70) has a deep recess depth (72) at a deep recess end (74), a shallow recess depth (76) at a shallow recess end (78), and a recess surface (80) between the deep recess end (74) and the shallow recess end (78). The distance between the deep recess end (74) and the shallow recess end (78) is the recess length (82). In the exemplary embodiment, the recess surface (80) is a sloped recess surface (80) which provides a gradual recess depth transition between the deep recess end (74) and the shallow recess end (78) along the recess length (82).

Referring to FIG. 3, in the exemplary embodiment, the shallow recess depth (76) is essentially zero, so that the recess depth varies along the recess length (82) from a maximum depth at the deep recess end (74) to zero at the shallow recess end (78).

Referring to FIGS. 1-8, in the exemplary embodiment, the directional coupling mechanism is further comprised of a plurality of rolling members (90) which are contained within the plurality of recesses (70) when the locking nut (20) is installed on the shaft (208).

In the exemplary embodiment, the rolling members (90) are cylindrical rollers having substantially round rolling surfaces (92), and the recesses (70) are sized to accommodate the length of the cylindrical rollers.

In the exemplary embodiment, a rolling member (90) is contained within each of the plurality of recesses (70) when the locking nut (20) is installed on the shaft (208). As a result, since the directional coupling mechanism in the exemplary embodiment is comprised of four recesses (70), the directional coupling mechanism in the exemplary embodiment is further comprised of four rolling members (90). In some other applications, some of the recesses (70) may not be provided with a rolling member (90) when the locking nut (20) is installed on the shaft (208), if the full locking force capacity of the locking nut (20) is not required for the particular application.

Each of the rolling members (90) is arranged within its corresponding recess (70) so that it is capable of rolling within the recess (70) a limited distance along the recess length (82), between the deep recess end (74) and a position toward the shallow recess end (74).

Each of the rolling members (90) has a rolling diameter (94) which is defined by its rolling surface (92). In the exemplary embodiment, the rolling diameter (94) of each of the rolling members (90) is greater than the shallow recess depth (76) of its corresponding recess (70).

Figure 2:
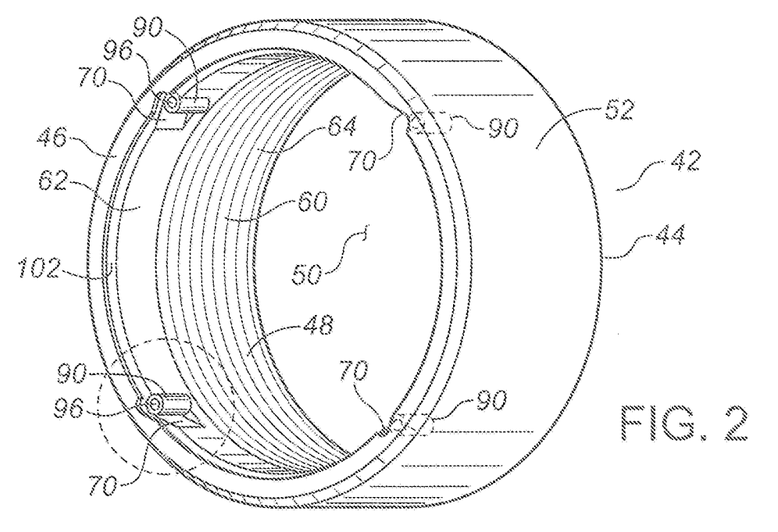
FIG. 2 is a pictorial view of the exemplary nut body depicted in FIG. 1, with exemplary rolling members inserted in the recesses.

In the exemplary embodiment, the rolling members (90) can be inserted into the recesses (70) from the second nut end (46) and can be removed from the recesses (70) from the second nut end (46) when the shaft (208) is received within the nut bore (50) and the nut engagement surface (48) is engaged with the cylinder engagement surface (22). This feature is facilitated in the exemplary embodiment by locating the recesses (70) adjacent to the second nut end (46) and by defining the recesses (70) in the nut engagement surface (48).

In the exemplary embodiment, each of the rolling members (90) is comprised of a rolling member tool surface (96), for engaging with a suitable tool (not shown) to facilitate removal of the rolling member (90) from its corresponding recess (70). In the exemplary embodiment, the rolling member tool surface (90) is comprised of a bore defined in the end of each of the rolling members (90) which is configured to receive a threaded rod (not shown) or a needle-nose pliers (not shown) therein. In the exemplary embodiment, the rolling member tool surfaces (96) are accessible from the second nut end (46) to assist in removing the rolling members (90) from the recesses (70) from the second nut end (46).

Figure 4:
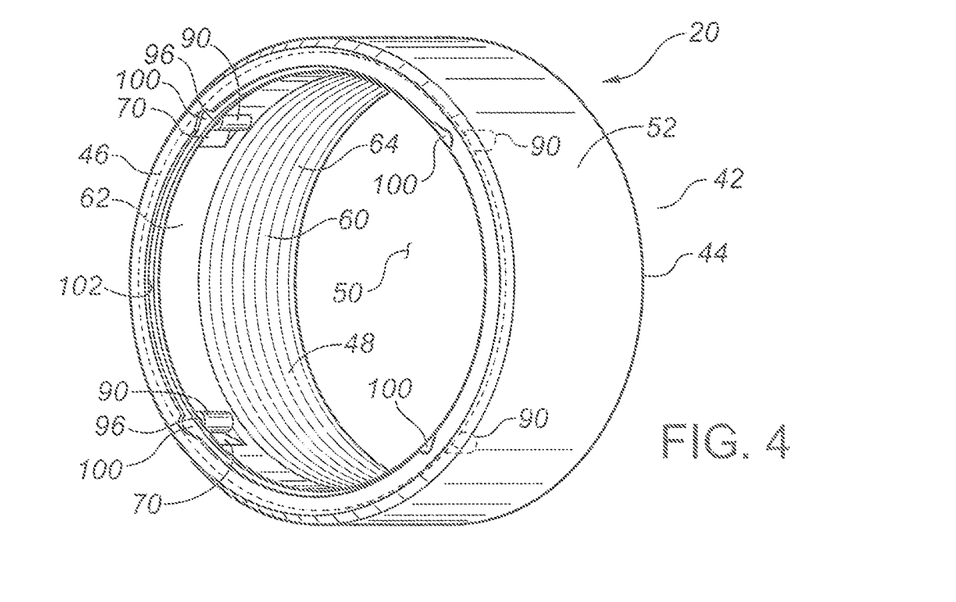
FIG. 4 is a pictorial view of the exemplary nut body depicted in FIG. 1, with exemplary rolling members inserted in the recesses, and an exemplary retaining ring mounted within the retaining ring groove in the exemplary nut body.
Figure 5:
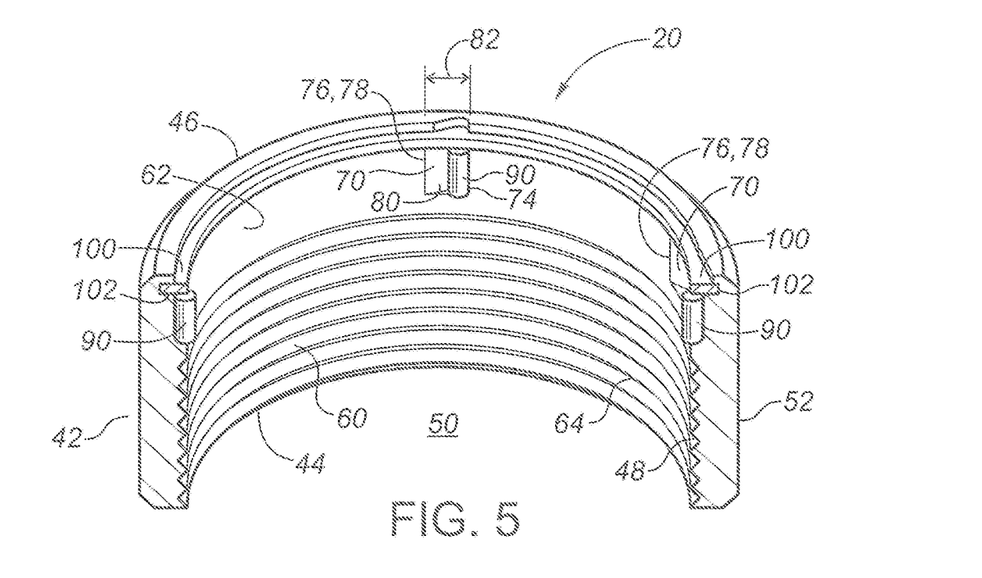
FIG. 5 is a transverse section pictorial view of the exemplary components of the locking nut depicted in FIG. 4, taken along line 5-5 in FIG. 4.
Figure 6:
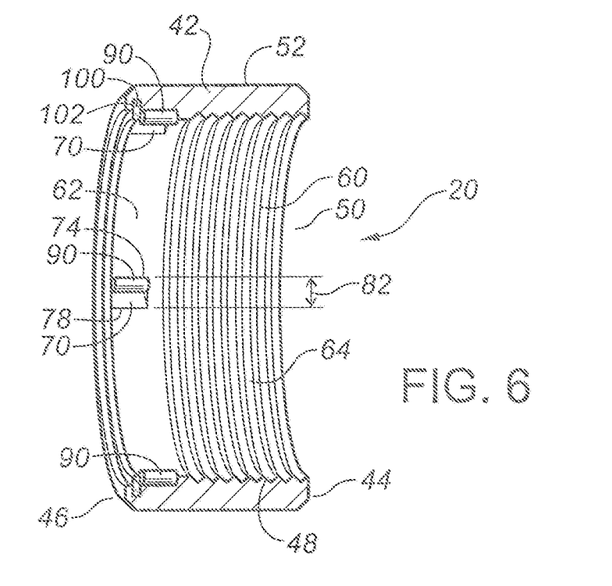
FIG. 6 is a side view of the transverse section pictorial view of FIG. 5.

Referring to FIGS. 4-6, in the exemplary embodiment, the directional coupling mechanism is further comprised of a retaining device for retaining the rolling members (90) within the recesses (70) when the locking nut (20) is installed on the shaft (208).

In the exemplary embodiment, the retaining device is comprised of a retaining ring (100) which is selectively connectable with the nut body (42) in order to retain the rolling members (90) within the recesses (70). In the exemplary embodiment, the retaining ring (100) is adjacent to the second nut end (46). In the exemplary embodiment, the retaining ring can be disconnected from the nut body (42) when the shaft (208) is received within the nut bore (50) and the nut engagement surface (48) is engaged with the cylinder engagement surface (22).

In the exemplary embodiment, the retaining device is further comprised of a retaining ring groove (102) defined by the nut body (42) adjacent to the second nut end (46), for selectively connecting the retaining ring (100) with the nut body (42). In the exemplary embodiment, the retaining ring groove (102) permits the retaining ring (100) to be inserted within the retaining ring groove (102) and permits the retaining ring (100) to be removed from the retaining ring groove (102) when the shaft (208) is received within the nut bore (50) and the nut engagement surface (48) is engaged with the cylinder engagement surface (22).

The locking nut (20) may be configured so that rotation of the locking nut (20) to the left relative to the shaft (208) is the locking direction, or may be configured so that rotation of the locking nut (20) to the right relative to the shaft (208) is the locking direction.

Figure 7:
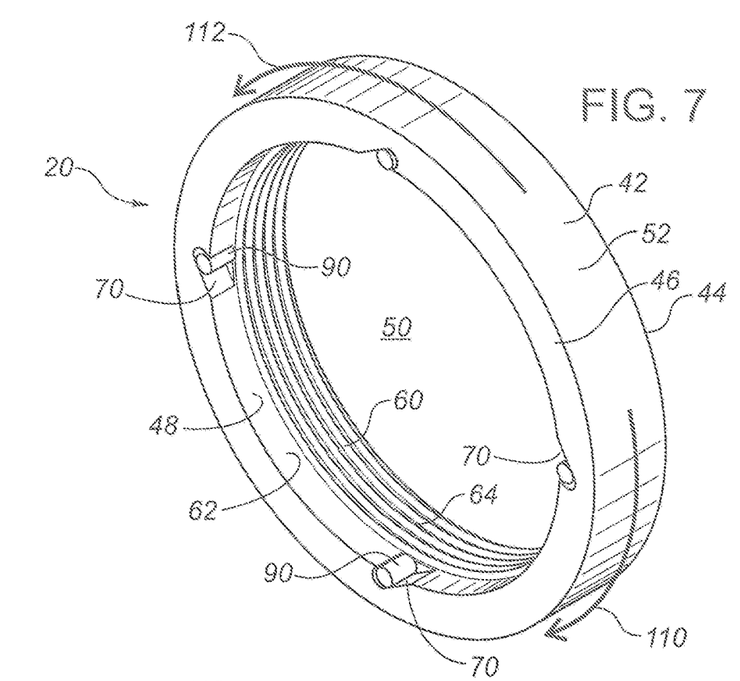
FIG. 7 is a schematic pictorial view of the exemplary nut body depicted in FIG. 1, with exemplary rolling members inserted in the recesses, depicting the effect of rotation of the exemplary nut body to the left and to the right relative to a cylinder upon which the exemplary nut body may be installed.
Figure 8:
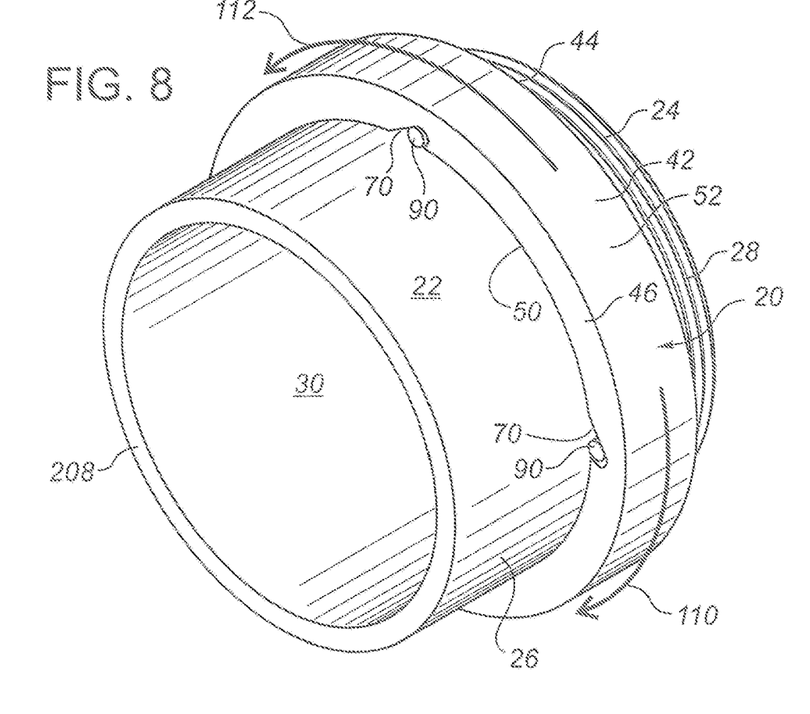
FIG. 8 is a pictorial view of the exemplary nut body depicted in FIG. 1 installed upon a shaft, with exemplary rolling members inserted in the recesses, depicting the effect of rotation of the exemplary nut body to the left and to the right relative to the shaft.

Referring to FIGS. 7-8, in applications for the exemplary embodiment of the locking nut (20) in which the locking nut (20) is installed on the shaft (208) of the exemplary rotary steerable drilling apparatus (200), rotation of the locking nut (20) to the right relative to the shaft (208) may be the locking direction (110), and rotation of the locking nut (20) to the left relative to the shaft (208) may be the rotating direction (112), thereby avoiding unintentional loosening of the threaded connection between the locking nut (20) and the shaft (208) during use of the exemplary rotary steerable drilling apparatus (200), in which the shaft (208) is rotated to the right relative to the housing (202).

As a result, referring to FIG. 3, the recesses (70) may be configured in such applications so that the rolling members (90) roll toward the shallow recess ends (78) of their corresponding recesses (70) in response to rotation of the locking nut (20) to the right relative to the shaft (208), thereby causing the rolling members (90) to become wedged between the recess surfaces (80) and the shaft (208) in order to lock the nut body (42) with the shaft (208).

An exemplary method of installing the exemplary embodiment of the locking nut (20) on the shaft (208) is as follows:

1. the nut body (42) may be passed over an end of the shaft (208) from the first nut end (44) so that the shaft (208) is received within the nut bore (50) and the nut engagement surface (48) is engaged with the cylinder engagement surface (22);
2. the retaining ring (100) may be passed over the end of the shaft (208) so that the retaining ring (100) surrounds the shaft (208) adjacent to the second nut end (46) of the nut body (42);
3. the rolling members (90) may be inserted within their corresponding recesses (70) from the second nut end (46) of the nut body (42);
4. the retaining ring (100) may be inserted within the retaining ring groove (102) from the second nut end (46) in order to removably connect the retaining ring (100) with the nut body (42) and thereby complete the assembly of the locking nut (20); and
5. the assembled locking nut (20) may be rotated relative to the shaft (208) in the rotating direction (112) in order to provide a threaded connection between the locking nut (20) and the shaft (208) and thereby complete the installation of the locking nut (20) on the shaft (208).

The assembly of the locking nut (20) and the installation of the locking nut (20) on the shaft (208) may follow a sequence which is different from the sequence listed above.

Once the locking nut (20) is fully assembled on the shaft (208), rotation of the locking nut (20) relative to the shaft (208) in the rotating direction (112) will be accommodated by the directional coupling mechanism which is provided by the rolling members (90) and their corresponding recesses (70), thereby enabling the threaded connection between the locking nut (20) and the shaft (208) to be made-up.

Once the locking nut (20) is fully assembled and installed on the shaft (208), rotation of the locking nut (20) relative to the shaft in the locking direction (110) will be resisted by the directional coupling mechanism which is provided by the rolling members (90) and their corresponding recesses (70).

An exemplary method of uninstalling the exemplary embodiment of the locking nut (20) from the shaft (208) is as follows:

1. the retaining ring (100) may be removed from the retaining ring groove (102) from the second nut end (46) in order to disconnect the retaining ring (100) from the nut body (42);
2. the rolling members (90) may be removed from their corresponding recesses (70) from the second nut end (46) of the nut body (42) by engaging the rolling member tool surfaces (96) with a suitable tool;
3. the nut body (42) may be rotated relative to the shaft (208) in the locking direction (110) in order to break the threaded connection between the locking nut (20) and the shaft (208).
4. the retaining ring (100) may be removed from the end of the shaft (208); and
5. the nut body (42) may be removed from the end of the shaft (208).

The disassembly of the locking nut (20) and the uninstallation of the locking nut (20) from the shaft (208) may follow a sequence which is different from the sequence listed above, as long as the rolling members (90) are removed from their corresponding recesses (70) before an attempt is made to rotate the nut body (42) relative to the shaft (208) in the locking direction (110).

In this document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be one and only one of the elements.

We claim:

1. A locking nut for installation on a cylinder, wherein the cylinder is comprised of a cylinder engagement surface comprising a threaded cylinder section, the locking nut comprising:
    (a) a nut body having a first nut end, a second nut end, and defining a nut engagement surface extending between the first nut end and the second nut end, wherein the nut engagement surface is engageable with the cylinder engagement surface;
    (b) the nut engagement surface comprising a threaded nut section, wherein the threaded nut section is threadably connectable with the threaded cylinder section; and
    (c) a directional coupling mechanism associated with the nut body, for locking the nut body with the cylinder in response to relative rotation between the nut body and the cylinder in a locking direction when the locking nut is installed on the cylinder wherein the directional coupling mechanism is comprised of:
        (i) a plurality of rolling members spaced around a circumference of the nut engagement surface, wherein the rolling members lock the nut body with the cylinder in response to relative rotation between the nut body and the cylinder in the locking direction when the locking nut is installed on the cylinder, and wherein the rolling members are interposed between the nut engagement surface and the cylinder engagement surface when the locking nut is installed on the cylinder; and
        (ii) a plurality of recesses defined in the nut engagement surface and spaced around the circumference of the nut engagement surface, wherein the plurality of rolling members is contained within the plurality of recesses so that the rolling members are spaced around the circumference of the nut engagement surface, wherein the recesses are located adjacent to the second nut end, and wherein the rolling members can be inserted into the recesses from the second nut end and can be removed from the recesses from the second nut end when the nut engagement surface is engaged with the cylinder engagement surface.

2. The locking nut as claimed in claim 1 wherein the recesses are wedge-shaped recesses, wherein each of the recesses has a deep recess depth at a deep recess end, a shallow recess depth at a shallow recess end, and a recess surface between the deep recess end and the shallow recess end, wherein each of the rolling members has a rolling diameter, and wherein the rolling diameter is larger than the shallow recess depth.

3. The locking nut as claimed in claim 2 wherein each of the rolling members is comprised of a round rolling surface.

4. The locking nut as claimed in claim 3 wherein the rolling members are cylindrical rollers.

5. The locking nut as claimed in claim 2 wherein each of the recess surfaces is a sloped recess surface.

6. The locking nut as claimed in claim 1, further comprising a retaining device for retaining the rolling members within the recesses when the locking nut is installed on the cylinder.

7. The locking nut as claimed in claim 6 wherein the retaining device is comprised of a retaining ring, wherein the retaining ring is selectively connectable with the nut body in order to retain the rolling members within the recesses, and wherein the retaining ring can be disconnected from the nut body when the nut engagement surface is engaged with the cylinder engagement surface.

8. The locking nut as claimed in claim 7 wherein the retaining device is further comprised of a retaining ring groove defined by the nut body adjacent to the second nut end for selectively connecting the retaining ring with the nut body, and wherein the retaining ring groove permits the retaining ring to be inserted within the retaining ring groove from the second nut end and permits the retaining ring to be removed from the retaining ring groove from the second nut end when the nut engagement surface is engaged with the cylinder engagement surface.

9. The locking nut as claimed in claim 1 wherein the threaded nut section extends along the nut engagement surface from the first nut end toward the second nut end.

10. The locking nut as claimed in claim 1 wherein the nut engagement surface is comprised of an unthreaded nut section and wherein the recesses are defined in the unthreaded nut section.

11. The locking nut as claimed in claim 10 wherein the unthreaded nut section extends along the nut engagement surface from the second nut end toward the first nut end.

12. The locking nut as claimed in claim 1 wherein each of the rolling members is comprised of a rolling member tool surface which is accessible from the second nut end, for engaging with a tool to facilitate removal of the rolling members from the recesses.

13. The locking nut as claimed in claim 1 wherein the recesses are spaced evenly around the circumference of the nut engagement surface.

14. The locking nut as claimed in claim 1 wherein the cylinder is a shaft.

15. The locking nut as claimed in claim 14 wherein the shaft defines a shaft bore extending through the shaft.

16. The locking nut as claimed in claim 14 wherein the shaft is a component of an apparatus for use in drilling a borehole.

17. The locking nut as claimed in claim 14 wherein the shaft is a component of a rotary steerable drilling apparatus.

18. The locking nut as claimed in claim 1 wherein the nut body defines a nut bore and wherein the nut engagement surface is comprised of the nut bore.

19. A method of installing a locking nut on a cylinder, wherein the cylinder is comprised of a cylinder engagement surface comprising a threaded cylinder section, the method comprising:
   (a) providing a locking nut, wherein the locking nut comprises:
      (i) a nut body having a first nut end, a second nut end, and defining a nut engagement surface extending between the first nut end and the second nut end, wherein the nut engagement surface comprises a threaded nut section; and
      (ii) a directional coupling mechanism associated with the nut body, wherein the directional coupling mechanism is comprised of a plurality of recesses spaced around a circumference of the nut engagement surface, and wherein the recesses are located adjacent to the second nut end;
   (b) engaging the nut engagement surface with the cylinder engagement surface;
   (c) inserting a plurality of rolling members into the recesses from the second nut end when the nut engagement surface is engaged with the cylinder engagement surface; and
   (d) threadably connecting the threaded nut section with the threaded cylinder section in order to install the locking nut on the cylinder.

20. The method as claimed in claim 19, wherein the locking nut is further comprised of a retaining device for retaining the rolling members within the recesses when the locking nut is installed on the cylinder, further comprising connecting the retaining device with the nut body in order to retain the rolling members within the recesses.

21. The method as claimed in claim 20 wherein the retaining device is comprised of a retaining ring and a retaining ring groove defined by the nut body and wherein connecting the retaining device with the nut body is comprised of inserting the retaining ring within the retaining ring groove.

22. The method as claimed in claim 21 wherein the retaining ring groove is defined by the nut body adjacent to the second nut end, further comprising inserting the retaining ring within the retaining ring groove from the second nut end when the nut engagement surface is engaged with the cylinder engagement surface.

23. The method as claimed in claim 21 wherein the retaining ring groove is defined by the nut body adjacent to the second nut end, further comprising removing the retaining ring from the retaining ring groove from the second nut end when the nut engagement surface is engaged with the cylinder engagement surface, and further comprising removing the rolling members from the recesses from the second nut end when the nut engagement surface is engaged with the cylinder engagement surface.

24. The method as claimed in claim 19 wherein the recesses are wedge-shaped recesses, wherein each of the recesses has a deep recess depth at a deep recess end, a shallow recess depth at a shallow recess end, and a recess surface between the deep recess end and the shallow recess end, wherein each of the rolling members has a rolling diameter, and wherein the rolling diameter is larger than the shallow recess depth.

25. The method as claimed in claim 24 wherein each of the rolling members is comprised of a round rolling surface.

26. The method as claimed in claim 19 wherein the nut body defines a nut bore and wherein the nut engagement surface is comprised of the nut bore.

* * * * *